US006875929B2

(12) United States Patent
Wermelinger

(10) Patent No.: US 6,875,929 B2
(45) Date of Patent: Apr. 5, 2005

(54) METHOD OF PRODUCING A COMPOSITE HIGH-VOLTAGE INSULATOR, HIGH-VOLTAGE INSULATOR AND PLASTIC MATERIAL FOR USE IN THE INVENTIVE METHOD, AND METHOD OF PRODUCING A NON-CYLINDRICAL COMPONENT

(75) Inventor: Anton Wermelinger, Ruswil (CH)

(73) Assignee: Wermelinger AG, Ruswil ( * ) Notice: Subject to any disclaimer, the term of this patent is extended or adjusted under 35 U.S.C. 154(b) by 254 days.

(21) Appl. No.: 10/220,456

(22) PCT Filed: Feb. 28, 2001

(86) PCT No.: PCT/EP01/02260
§ 371 (c)(1),
(2), (4) Date: Dec. 16, 2002

(87) PCT Pub. No.: WO01/65571
PCT Pub. Date: Sep. 7, 2001

(65) Prior Publication Data
US 2003/0159849 A1 Aug. 28, 2003

(30) Foreign Application Priority Data
Mar. 1, 2000 (CH) ........................................ 2000 402/00
Jun. 27, 2000 (EP) ............................................ 00113561

(51) Int. Cl.[7] ............................................. H01B 17/00
(52) U.S. Cl. ............... 174/156; 174/137 R; 174/138 F; 174/211
(58) Field of Search ............................. 174/211, 137 R, 174/138 F, 156; 264/135, 239, 232, 236, 263, 254, 261, 272.15

(56) References Cited

U.S. PATENT DOCUMENTS

| 4,312,123 A | 1/1982 | Wheeler |
| 4,724,284 A | 2/1988 | Wheeler |
| 5,641,831 A | 6/1997 | Hamilton |
| 5,753,768 A | 5/1998 | Ellis |
| 6,007,651 A | 12/1999 | Ishino |

FOREIGN PATENT DOCUMENTS

| DE | 196 10 830 A1 | 10/1996 |
| GB | 1 471 083 | 4/1977 |

*Primary Examiner*—Dean A. Reichard
*Assistant Examiner*—Jinhee Lee
(74) *Attorney, Agent, or Firm*—Frost Brown Todd LLP

(57) ABSTRACT

The invention relates to a method of producing a high-tension insulator including an elongated central solid or hollow body (1), a synthetic material shield layer (6) and one or more synthetic material weathersheds (3) by the following steps:

applying said synthetic material shield layer (6) to said solid or hollow body by molding or extrusion;

molding said synthetic material weathersheds (3); one of the synthetic materials of said shield layer (6) and the synthetic material of said weathersheds (3) being partly cross-linked and the other of said synthetic materials being at least partly cross-linked.

locating said weathersheds (3) at a predetermined site on said shield layer (6); and totally cross-linking the thus formed blank of said high-tension insulator.

30 Claims, 1 Drawing Sheet

METHOD OF PRODUCING A COMPOSITE HIGH-VOLTAGE INSULATOR, HIGH-VOLTAGE INSULATOR AND PLASTIC MATERIAL FOR USE IN THE INVENTIVE METHOD, AND METHOD OF PRODUCING A NON-CYLINDRICAL COMPONENT

FIELD OF THE INVENTION

The present invention relates to a method of producing a high-tension composite insulator, to a high-tension composite insulator obtainable by this method and to a synthetic material as used in the method. Furthermore, the invention relates to a corresponding method for producing a non-cylindrical component.

BACKGROUND OF THE INVENTION

The term high-tension as used in conjunction with the invention is to be understood broadly and relates to voltages exceeding 1,000 volts, it including in addition to the high-voltage range in a narrow sense also the medium-voltage range.

High-tension composite insulators are multifunctional components mainly serving electrical insulation as regards leakage distance, dielectric strength and arc withstanding capacity. From a mechanical point of view they handle tensile and compressive stresses, bending whilst also providing mounting functions, for example, as hollow insulators for switches.

Known from prior art are high-tension insulators made of ceramics, cast resin and composite materials, it being the latter that are gaining increasing acceptance. These comprise typically a composite of a glass-fiber reinforced cylindrical rod (solid body) or tube (hollow body) centrally and a shield layer of synthetic material, particularly silicone rubber. As a rule the shield layer itself is made up in turn of an envelope covering the solid or hollow body with weathersheds protruding therefrom like scales and serving to divert away rain and lengthen the so-called leakage distance, i.e. the shortest distance for the leakage current between the two ends of the rod or tube. Secured to the solid or hollow body are end fittings specific to the application concerned. The combination of a solid or hollow body and a synthetic material envelope is simple termed "core" in the following.

Composite insulators including shield layers of a synthetic material, particularly silicone, are given preference mainly for two reasons. Firstly the shield layer of a synthetic material, particularly silicone, is hydrophobic, i.e. the insulators employed mostly outdoors are highly water repellant which is conducive to repelling dirt and thus to low leakage current losses. Secondly, this is a lightweight structure which facilitates assembly.

In practice, a basic distinction is made between two methods of producing composite insulators:

a) the so-called single-molded envelope (see FIG. 1). In this method the shield layer and the weathersheds (the envelope) 2 are molded in a single operation on a solid or hollow body 1 in a mold split lengthwise. The disadvantage here is the the lack of flexibility in producing differing insulator shapes. Apart from this, no undercuts such as grooves on the weathersheds, for instance, can be molded unless multipart molds are used which, however, add considerably to the production costs;

b) a multistage production method (see FIG. 2) in which a shield layer 6 is applied to the solid or hollow body by molding or extrusion whilst the weathersheds 3 are prefabricated separately as a rule by injection and/or compression molding to then be mounted over the core and secured thereto by an adhesive.

Whilst method b) permits substantially more flexible production than method a) it is still not considered as being an optimum. The bonding joints 4 between weathershed and core have a history of being electrical erosion problem locations, likewise any remaining adhesive film 4a on the core between the weathersheds. Another factor lacking economy is the need to apply the adhesive in special procedures and for the aforementioned electrical reasons to carefully remove excess deposits after siting the weathersheds by tedious manual cleaning.

The object of the invention is accordingly to provide a flexible process of producing high-tension composite insulators which avoids the need to adhesively bond shield layer and weathersheds, this also involving providing a corresponding product, a corresponding material as well as a method in general.

SUMMARY OF THE INVENTION

The invention relates to a method of producing a high-tension insulator comprising an elongated central solid or hollow body, a synthetic material shield layer and one or more synthetic material weathersheds by the following steps: applying the synthetic material shield layer to the solid or hollow body by molding or extrusion; molding the synthetic material weathersheds; one or both of the synthetic material of the shield layer and the synthetic material of the weathersheds being partly cross-linked and, if appropriate, the synthetic material of the shield layer or weathersheds not partly cross-linked being substantially totally cross-linked. The further steps involve locating the weathersheds at specific sites on the shield layer and then totally cross-linking the thus formed blank of the high-tension insulator.

In accordance with another aspect the invention provides a high-tension insulator comprising an elongated central solid or hollow body, a synthetic material shield layer and one or more weathersheds, the high-tension insulator being obtainable by the method as cited above.

In accordance with yet another aspect the invention is directed to a synthetic material for use in the method as cited above. The synthetic material comprises at least two cross-linking catalysts reacting at different temperatures or at least two different inhibitors inhibiting an addition reaction up to different temperatures.

In accordance with still another aspect the invention is directed to a method of producing a non-cylindrical component comprising an elongated central solid or hollow body, a synthetic material shield layer and one or more synthetic material fin members. This method comprises the steps: applying the synthetic material shield layer to the solid or hollow body by molding or extrusion; molding the synthetic material fin members; one or both of the synthetic material of the shield layer and the synthetic material of the fin members being partly cross-linked and, if appropriate, the synthetic material of the shield layer or fin members not partly cross-linked being substantially totally cross-linked. The further steps involve locating the fin members at predetermined sites on the shield layer and then totally cross-linking the thus formed assembly.

Concrete formulations and advantageous aspects read from the sub-claims.

DESCRIPTION OF THE PREFERRED EMBODIMENTS

Figure 1:
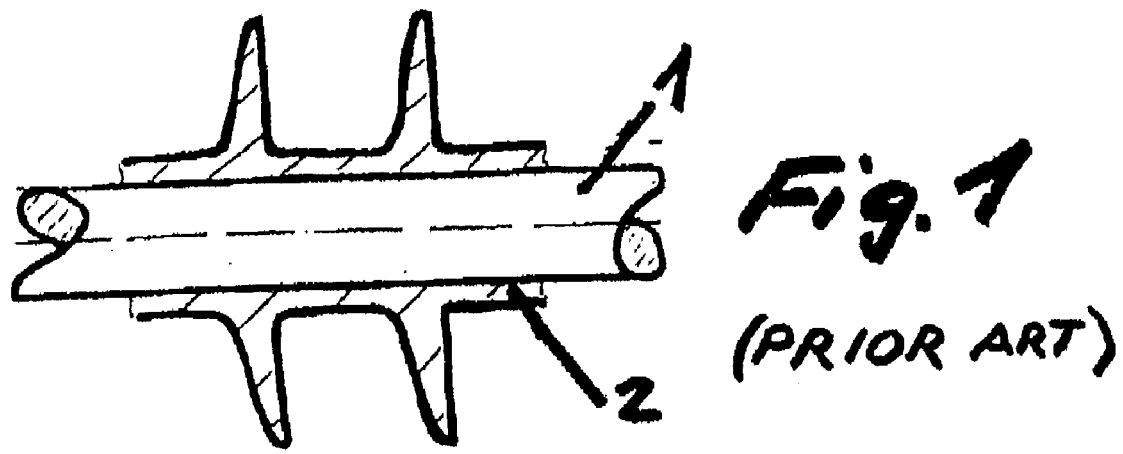
FIG. 1 is a cross-sectional view of part of a prior art high-tension composite insulator whose envelope is produced integrally.
Figure 2:
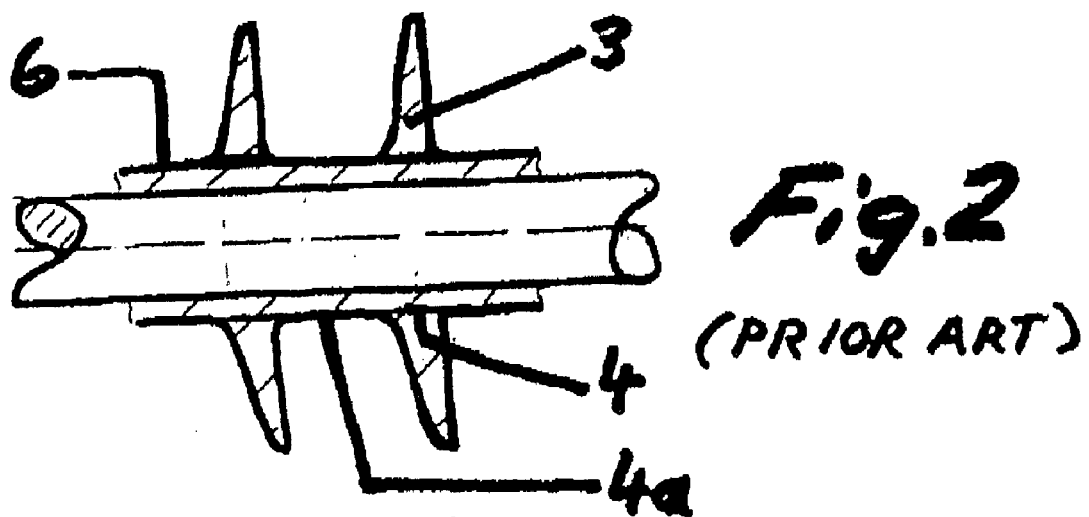
FIG. 2 is a cross-sectional view of part of a prior art high-tension composite insulator including weathershed bonded to the shield layer and a bonded joint.
Figure 3:
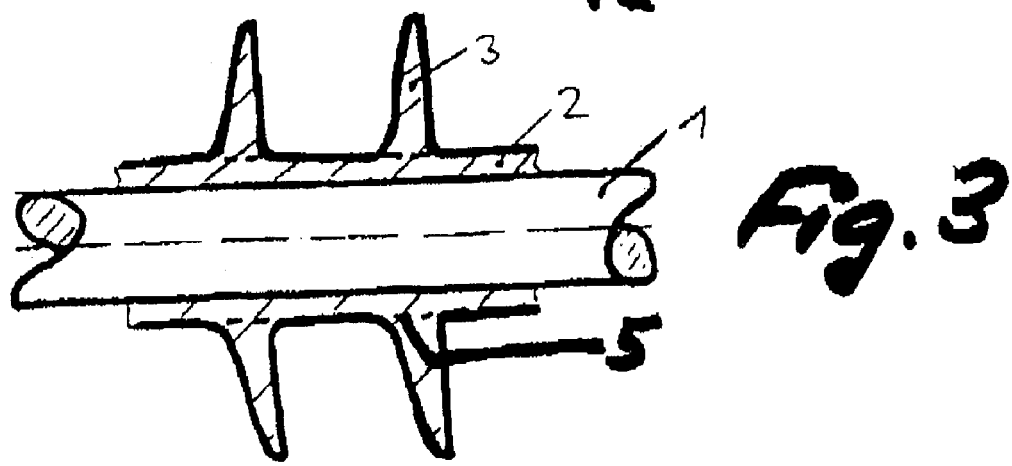
FIG. 3 is a diagrammatic cross-sectional view of part of one example embodiment of a high-tension composite insulator in accordance with the invention comprising a two-part produced envelope with no bonded joint.

Example aspects will now be detailled with reference to FIG. 3.

The composite insulator comprises an electrically insulating, elongated central body 1 for handling at least tensile stresses and e.g. takes the form of a rod or tube. It is made for example of a glass-fiber reinforced synthetic material. Extruded on the body 1 is a thin shield layer 2 e.g. of silicone rubber. Located on the shield layer 2 are weathersheds 3 projecting radially or at an angle thereto. These are prefabricated e.g. by injection and/or compression molding. The shield layer 2 and the weathersheds 3 are chemically interconnected at the contact surface areas 5 situated along the circumference as detailed later. To elongate the leakage distance the weathersheds 3 may include tins or grooves on one or both sides.

Highly stable covalent chemical bonds between shield layer and weathershed are achievable by the flush connection of the synthetic material shield layer and synthetic material weathersheds of the insulator, i.e. with no gap in between, of which at least one is only partially cross-linked (scorched) and, if appropriate, the other is substantially fully cross-linked by means of total cross-linking (vulcanization) as described in the abstract of the invention, This is quite obvious for the case of partial cross-linking of both envelope components. However, also in the case of a substantially total cross-linking of one of the envelope components a chemically covalent bond between scorched and fully vulcanized envelope components is possible, since also in the case of a fully vulcanized synthetic material sufficient reactive groups still exist as a rule near to the surface to enter into stable chemical bonds with the scorched synthetic material under the influence of the remaining cross-linking catalyst material therein as is well-known to the person skilled in the art of synthetic adhesives, for instance. Thus, in both cases a physically homogenous envelope having no electrical joints is formed.

One synthetic material preferred for use in the method in accordance with the invention is silicone rubber. This is why the subsequent description of the method mainly involves silicone rubber, It will readily be appreciated, however, that the invention is not restricted to the silicone rubber, it instead covering all insulating synthetic materials, e.g. polyethylene, ethylene ethylacrylate copolymer, ethylene vinylacetate copolymer, ethylene propylene copolymer (EPM), ethylene propylene diene terpolymer (EPDM), chlorosulfonated polyethylene, polypropylene, butylacrylate glycidylmethacrylate copolymer, polybutene, butyl rubbers and ionomeric polymers.

In principle, cross-linking the synthetic material may be done by any known technique, including radiation cross-linking; preferably, however, this is done by means of a catalyst.

The partial cross-linking of the synthetic material according to the method of the invention may be implemented likewise by means of metered radiation or by means of a sole cross-linking catalyst or in the case of silicone rubbers cross-linked by addition reaction by means of a sole inhibitor by suitably selecting reaction time and temperature. Preferably, however, at least two cross-linking catalysts having different reaction temperatures are used. In this case the catalyst having the lowest reaction temperature is preferably employed in an amount insufficient to fully cross-link the synthetic material; and catalyst(s) having a higher reaction temperature is/are preferably employed only in an amount just sufficient in combination with the catalyst having the lowest reaction temperature to fully cross-link the synthetic material. The specific amounts of these crosslinking catalysts depend on the nature of the catalyst and of the synthetic material and can be determined by routine experiments. The partly cross-linked or scorched envelope components should permit good handling and be dimensionally stable. The amount of the catalyst(s) reacting at the higher temperatures can be computed from the knowledge gained from the catalyst reacting at the lower temperature or determined by simple experiments. Where silicone rubber cross-linked by addition reaction is concerned at least two cross-linking inhibitors inhibiting the cross-linking reaction up to different temperatures are employed.

The preferred radically cross-linking silicone rubber is poly(dimethyl-methylvinyl siloxane) more particularly as marketed by Wacker Chemie under the tradename "Powersil 310" which is a poly(dimethyl-methylvinyl siloxane) comprising highly disperse silicic acid as a einforcing filler and aluminum trihydrate to enhance the resistance to leakage current.

For partial cross-linking (scorching) preferably two free radical catalysts dissociating at different temperatures are added to the silicone rubber as cited above, Preference is given to peroxide catalysts, more particularly bis(2,4-dichlorobenzoyl peroxide) (50% in silicone oil, "Vernetzer E" of Wacker Chemie) which begins to react at 90° C., and 2,5-bis(tert-butylperoxy)-2,5-dimethylhexane (45% in silicone rubber, "Vernetzer C6" of Wacker Chemie) which reacts at 170–190° C.

The amounts of the free radical catalysts reacting at different temperatures as specifically employed depend on their nature and on the rubber employed and can be easily determined by the person skilled in the art by simple experiments taking into account the general description as cited above. For scorching, for instance, the "Vernetzer E" is made use of to an amount of less than approximately 1.5% by weight relative to silicone rubber and for subsequent total vulcanization use is made, for instance, of "Vernetzer C6" in an amount of less than approximately 0.6% by weight relative to silicone rubber.

The silicone rubber for cross-linking by addition reaction is preferably poly(dimethyl-methylvinyl siloxane) aggregated preferably with a hydrogen siloxane, e.g. poly(dimethyl-hydrogenmethyl siloxane). For the catalysts preference is given to platinum catalysts. To implement partial cross-linking at least one inhibitor is added to the silicone rubber, preferably at least two inhibitors, for the addition reaction.

The amount of the inhibitors controls the so-called starting temperature at which for a given inhibitor the reaction is actually started. The inhibitor intended for the lowest starting temperature is employed preferably in an amount which results in a starting temperature which is low enough so that the silicone rubber is not totally cross-linked whilst the inhibitor(s) intended for the higher starting temperature is/are employed in such an amount that total cross-linking occurs at a temperature at the desired temperature difference.

The specific amounts of these starting catalysts depend on the nature of the inhibitor and silicone rubber and can be determined by the person skilled in the art by simple experiments similar to that as described above for the cross-linking catalysts.

Examples of inhibitors are vinylmethyl siloxane (1:3) (available from Wacker Chemie under the trade designation PT67) (usual amount employed for sole use being 0.5 to 0.75% by weight relative to silicone rubber) and a 5% solution of ethynylcyclohexanol in silicone oil (available from Wacker Chemie under the trade designation PT88) (usual amount employed for sole use being 0.25 to 0.5% by weight relative to silicone rubber).

Should one of the envelope components be already fully vulcanized in the method in accordance with the invention any catalyst suitable for the particular method of production (e.g casting, extrusion, injection and/or compression molding) may be used. These catalysts are well known to the person skilled in the art, they including the catalysts E, C6 as cited above and platinum catalysts.

The method as disclosed is not merely suitable for the cited high-tension composite insulators, it likewise finding application to advantage for all items formed in a similar way. Correspondingly, the abstract of the invention also cites a method for producing non-cylindrical components comprising an elongated solid or hollow body, a (preferably cylindrical) envelope of synthetic material and a plurality of fins of synthetic material. These components may be, for instance, flexible tubes or pipes provided with e.g. reinforcement, supporting or fastener elements on the surface. The steps in the method are the same as those as already described for the method of producing a high-tension composite insulator and including advantageously the aspects thereof.

In one concrete example of producing a high-tension composite insulator a shield layer of the "Powersil 310" silicone rubber as cited above is extruded with a sole cross-linking peroxide on a rod and substantially cross-linked weathersheds formulated with an amount of the Vernetzer E (cross-linking compound E) as cited above, not sufficient for full vulcanization, and an amount of the Vernetzer C6 (cross-linking compound C6) as cited above as required for full vulcanization are injection molded at 140° C. and thereby scorched. The core is equipped with the weathersheds in a flush arrangement and full vulcanization is implemented in a vulcanization oven at 170° C. The result is a rugged connection between shield layer and weathersheds.

The purpose in general of the embodiments as disclosed is thus to provide an improved method of producing a high-tension insulator, or more generally, a non-cylindrical component, a correspondingly produced high-tension insulator as well as a synthetic material for this purpose.

All publications and existing systems cited in this specification are herein incorporated by reference.

Although certain methods, devices and insulator and synthetic material products in accordance with the invention have been described herein, the scope of coverage of this patent is not restricted thereto. On the contrary, the present patent covers all embodiments of the invention falling within the scope of the appended claims either literally or under the doctrine of equivalents.

What is claimed is:

1. A method of producing a high-tension insulator comprising an elongated central solid or hollow body (1), a synthetic material shield layer (6) and one or more synthetic material weathersheds (3) by the following steps:

applying said synthetic material shield layer (6) to said solid or hollow body by molding or extrusion;

molding said synthetic material weathersheds (3); one of the synthetic materials of said shield layer (6) and the synthetic material of said weathersheds (3) being partly cross-linked and the other of said synthetic materials being at least partly cross-linked.

locating said weathersheds (3) at a predetermined site on said shield layer (6); and totally cross-linking the thus formed blank of said high-tension insulator.

2. The method as set forth in claim 1 wherein both the synthetic material of said shield layer and the synthetic material of said weathersheds comprise silicone rubber.

3. The method as set forth in claim 2 wherein the synthetic material of said shield layer and the synthetic material of said weathersheds are identical.

4. The method as set forth in claim 1 wherein both the synthetic material of said shield layer and the synthetic material of said weathersheds comprise at least one cross-linking catalyst.

5. The method as set forth in claim 2 wherein said synthetic material to be partly cross-linked comprises at least two cross-linking catalysts which react at different temperatures.

6. The method as set forth in claim 5 wherein a crosslinking catalyst reacting at a lowest temperature is employed in an amount not sufficient to fully cross-link said synthetic material.

7. The method as set forth in claim 6 wherein one or more cross-linking catalysts for reacting at a higher temperature are employed in an amount just sufficient to cause said full cross-linking following partial cross-linking.

8. The method as set forth in claim 2 wherein either the synthetic material of said shield layer or the synthetic material of said weathersheds or both synthetic materials comprise a synthetic material to be cross-linked by free radical catalysis, including at least one free radical catalyst.

9. The method as set forth in claim 8 wherein said synthetic material to be cross-linked by free radical catalysis includes two free radical catalysts.

10. The method as set forth in claim 8 wherein said synthetic material to be cross-linked by free radical catalysis is poly(dimethyl-methylvinyl siloxane).

11. The method as set forth in claim 8 wherein said at least one catalyst is a peroxide catalyst.

12. The method as set forth in claim 5 wherein a free radical catalyst having a lower dissociation temperature is bis(2,4-dichlorobenzoyl peroxide) and a free radical catalyst having an higher dissociation temperature is 2,5-bis (tert-butylperoxy)-2,5-dimethylhexane.

13. The method as set forth in claim 2 wherein one or both synthetic materials comprise a synthetic material for cross-linking by addition reaction including at least one addition catalyst and at least one inhibitor for said addition reaction.

14. The method as set forth in claim 13 wherein said addition catalyst is a platinum catalyst.

15. The method as set forth in claim 13 wherein said synthetic material to be cross-linked by addition reaction comprises poly(dimethyl-methylvinyl siloxane).

16. The method as set forth in claim 15 wherein said synthetic material to be cross-linked by addition reaction furthermore comprises a hydrogen siloxane.

17. The method as set forth in claim 16 wherein said hydrogen siloxane is poly(dimethyl-hydrogenmethyl siloxane).

18. The method as set forth in claim 13 wherein said synthetic material comprises at least two different inhibitors inhibiting an addition reaction up to different temperatures (starting temperatures).

19. The method as set forth in claim 18 wherein said at least two inhibitors comprise vinylmethyl siloxane (1:3) and ethynylcyclohexanol.

20. The method as set forth in claim 18 wherein an inhibitor having the lowest starting temperature is added in an amount not sufficient to fully cross-link said synthetic material.

21. The method as set forth in claim 1 wherein synthetic material seals for the fittings applied to the end of said central solid or hollow body are applied in the same way as said weathersheds.

22. A high-tension insulator comprising an elongated central solid or hollow body (1), a shield layer (6) of a synthetic material and one or more weathersheds (3) obtainable by the method as set forth in claim 5.

23. A high-tension insulator comprising an elongated central solid or hollow body (1), a shield layer (6) of a synthetic material and one or more weathersheds (3) obtainable by the method as set forth in claim 6.

24. A high-tension insulator comprising an elongated central solid or hollow body (1), a shield layer (6) of a synthetic material and one or more weathersheds (3) obtainable by the method as set forth in claim 7.

25. A high-tension insulator comprising an elongated central solid or hollow body (1), a shield layer (6) of a synthetic material and one or more weathersheds (3) obtainable by the method as set forth in claim 9.

26. A high-tension insulator comprising an elongated central solid or hollow body (1), a shield layer (6) of a synthetic material and one or more weathersheds (3) obtainable by the method as set forth in claim 12.

27. A high-tension insulator comprising an elongated central solid or hollow body (1), a shield layer (6) of a synthetic material and one or more weathersheds (3) obtainable by the method as set forth in claim 18.

28. A high-tension insulator comprising an elongated central solid or hollow body (1), a shield layer (6) of a synthetic material and one or more weathersheds (3) obtainable by the method as set forth in claim 19.

29. A high-tension insulator comprising an elongated central solid or hollow body (1), a shield layer (6) of a synthetic material and one or more weathersheds (3) obtainable by the method as set forth in claim 20.

30. A high-tension insulator comprising an elongated central solid or hollow body (1), a shield layer (6) of a synthetic material and one or more weathersheds (3) obtained by the method as set forth in claim 1.

* * * * *